US010434443B2

(12) United States Patent
Bippus et al.

(10) Patent No.: US 10,434,443 B2
(45) Date of Patent: Oct. 8, 2019

(54) WATER FILTER PURGE INDICATION

(71) Applicant: WHIRLPOOL CORPORATION, Benton Harbor, MI (US)

(72) Inventors: Melissa M. Bippus, Evansville, IN (US); Ronald W. Guess, Evansville, IN (US); John A. Laine, Evansville, IN (US); Li Y. Situ, Evansville, IN (US); Keith A. Snyder, Newburgh, IN (US); Dennis J. Staley, Evansville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 410 days.

(21) Appl. No.: 15/176,689

(22) Filed: Jun. 8, 2016

(65) Prior Publication Data

US 2016/0279545 A1    Sep. 29, 2016

Related U.S. Application Data

(62) Division of application No. 13/802,965, filed on Mar. 14, 2013, now Pat. No. 9,366,474.

(51) Int. Cl.
*B01D 36/00* (2006.01)
*F25D 23/12* (2006.01)
*B01D 35/143* (2006.01)
*B65D 83/14* (2006.01)
*C02F 1/00* (2006.01)

(52) U.S. Cl.
CPC ....... *B01D 35/143* (2013.01); *B01D 35/1435* (2013.01); *B01D 36/001* (2013.01); *B65D 83/754* (2013.01); *C02F 1/003* (2013.01); *F25D 23/126* (2013.01); *C02F 2209/40* (2013.01); *C02F 2209/445* (2013.01); *C02F 2307/12* (2013.01); *F25D 2323/121* (2013.01)

(58) Field of Classification Search
CPC .............. B01D 35/143; B01D 35/1435; B01D 36/001; F25D 23/126
See application file for complete search history.

(56) References Cited

U.S. PATENT DOCUMENTS

| 5,587,055 | A | * | 12/1996 | Hartman | ................. | B01D 3/42 |
|-----------|---|---|---------|---------|------------------|-----------|
|           |   |   |         |         |                  | 202/162   |
| 6,882,280 | B2 |  | 4/2005  | Ferragut, II | | |
| 7,445,703 | B2 |  | 11/2008 | Savage et al. | | |
| 8,066,350 | B2 |  | 11/2011 | Yoshida | | |
| 8,082,018 | B2 |  | 12/2011 | Duchon et al. | | |

(Continued)

FOREIGN PATENT DOCUMENTS

CN         202490501 U   * 10/2012
EP          2180390          4/2010

*Primary Examiner* — Nelson J Nieves
(74) *Attorney, Agent, or Firm* — Price Heneveld LLP (57) ABSTRACT

A refrigeration system includes a water circulation system and a replaceable water filter. The refrigerator includes a sensor that determines if a water filter is present, and a user interface that prompts a user to purge a water filter upon installation of a new water filter in the refrigerator. The water filter may include a memory storage device that stores information concerning the allowable life of the water filter, the remaining life of the water filter, and other information. Information concerning the remaining life of the water filter and other information can be displayed or otherwise communicated to a user by the user interface.

6 Claims, 6 Drawing Sheets

(56) References Cited

U.S. PATENT DOCUMENTS

| | | |
|---|---|---|
| 8,700,809 B2 | 4/2014 | Ferragut, II et al. |
| 8,797,327 B2 | 8/2014 | Finn et al. |
| 9,057,554 B2 | 6/2015 | Quinlan et al. |
| 2003/0168389 A1 | 9/2003 | Astle et al. |
| 2007/0205160 A1* | 9/2007 | Savage ................. B01D 61/22 210/746 |
| 2008/0156711 A1 | 7/2008 | Vitan et al. |
| 2008/0210622 A1 | 9/2008 | Rachel et al. |
| 2009/0133430 A1* | 5/2009 | Roetker ............... B67D 1/0858 62/393 |
| 2009/0159611 A1* | 6/2009 | Roetker ............... B67D 1/0858 222/1 |
| 2009/0165494 A1* | 7/2009 | Muthumani ........... B67D 1/001 62/390 |
| 2009/0293528 A1* | 12/2009 | Buchstab ............. B01D 29/603 62/318 |
| 2012/0080445 A1* | 4/2012 | Moezidis ................ F25D 23/12 222/1 |
| 2012/0144855 A1* | 6/2012 | Krause .................. B01D 29/58 62/331 |
| 2012/0318723 A1* | 12/2012 | Guess .................. B01D 35/143 210/85 |
| 2014/0174996 A1* | 6/2014 | Krause .................. B01D 35/14 210/91 |

* cited by examiner

WATER FILTER PURGE INDICATION

CROSS-REFERENCE TO RELATED APPLICATION

The present application is a divisional of U.S. patent application Ser. No. 13/802,965 filed Mar. 14, 2013, entitled WATER FILTER PURGE INDICATION, the entire disclosure of which is hereby incorporated herein by reference.

BACKGROUND OF THE INVENTION

Known refrigerators may include a water dispenser and/or an ice maker. The ice maker and water dispenser are typically connected to an external source of water, whereby water flows through a water circulation system in the refrigerator to the ice maker and/or the dispenser.

Such refrigerators may include a water filter to filter the water supplied to the water dispenser and/or ice maker. Water filters must be replaced after the service life of the filter has expired. After installation of a new water filter, air should be purged from the water filter to ensure proper operation. Purging involves causing water to flow into and through the water filter, thereby displacing air in the water filter.

SUMMARY OF THE INVENTION

One aspect of the present disclosure is a refrigerator including an insulated cabinet forming a refrigerated internal space. The refrigerator includes a powered refrigeration system providing controlled cooling of the refrigerated internal space. The refrigerator also includes a water system configured to distribute water from an external source to a dispenser. The dispenser may comprise a water dispenser or an ice maker. The water system includes at least one fluid conduit. A replaceable water filter unit is detachably connected to the fluid conduit whereby water flowing through the conduit is filtered by the water filter. Upon initial installation of the water filter in the refrigerator, the filter can be purged by causing a predefined amount of water to flow through the water filter. The refrigerator also includes a control feature that can be actuated by a user to cause water to flow through the water filter unit. The refrigerator still further includes a user interface configured to prompt a user to actuate the control feature to purge the water filter by causing water to flow through the water filter upon installation of a water filter. The refrigerator may include a controller and a sensor that is operably connected to the controller. The sensor can be utilized by the controller to determine if a water filter is installed. The controller may be configured to cause the user interface to prompt a user if the controller determines that a new water filter has been installed to thereby signal a user to purge the water filter.

The water filter may include a memory unit that communicates with the controller, wherein the memory unit stores information relating to an amount of water that has passed through the water filter and/or an allowable amount of water that can pass through the water filter unit before replacement of the water filter is required. The memory unit may store the time that the water filter has dispensed water and/or an allowable amount of time the water can be dispensed through the filter before replacement of the water filter is required or the time the water filter has been installed and/or the amount of time the water filter can be installed before replacement of the water filter is required.

Another aspect of the present invention is a method of prompting a purge of a water filter following installation of the water filter in a refrigeration unit of the type having a water circulation system and a user interface. The method includes providing a refrigerator with a sensor that is capable of determining if a new water filter has been installed in the refrigerator. The method further includes causing the user interface to generate a purge signal indicating that the new water filter needs to be purged after installation of the new water filter.

These and other features, advantages, and objects of the present invention will be further understood and appreciated by those skilled in the art by reference to the following specification, claims, and appended drawings.

DETAILED DESCRIPTION

Figure 1:
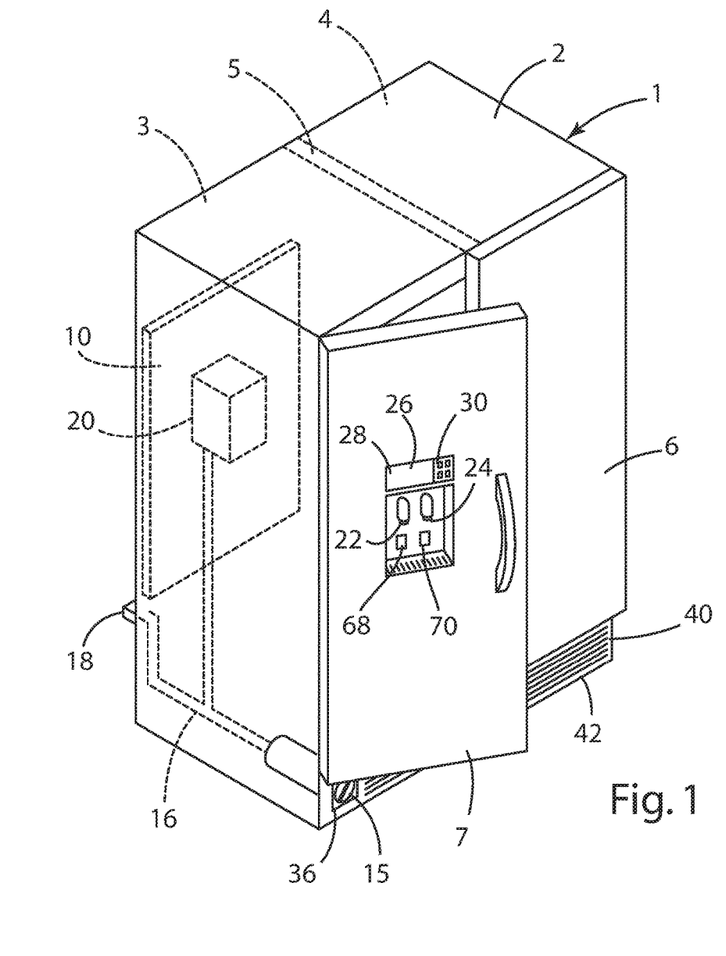
FIG. 1 is an isometric view of a refrigerator according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 according to one aspect of the present disclosure includes an insulated cabinet 2 forming an interior freezer space 3 and a refrigeration compartment 4 that may be separated by a partition 5. The refrigeration compartment 4 may be selectively closed off by a door 6, and the freezer space 3 may be selectively closed off by a door 7. A powered refrigeration system 10 cools the freezer space 3 and refrigeration compartment 4. The powered refrigeration system 10 may comprise a conventional refrigeration system including a compressor, an evaporator, and a condenser. The powered refrigeration system 10 may also comprise other known refrigeration systems. The insulated cabinet 2, freezer space 3, refrigeration compartment 4, and doors 6 and 7 may be constructed according to known designs, and these features will not therefore be described in detail.

Refrigerator 1 includes a replaceable water filter 15 that is operably connected to a water distribution system 16 having a connector 18 that is configured to supply water to the water distribution system 16 from an external water source 18. The water distribution system may be operably connected to an ice maker 20 disposed in freezer space 3 or refrigerator space 4. Ice maker 20 may also be disposed in a cooled housing/box (not shown) disposed in refrigerator space 4. Ice maker 20 may supply ice to an ice dispenser 22 disposed on door 7 in a known manner. Similarly, the water distribution system 16 may provide water to a water dispenser 24 disposed on door 7. As discussed in more detail below, user inputs such as buttons or levers 68 and 70 may be operably connected to a controller 12 (FIG. 2), such that actuation of buttons or levers 68 and 70 causes controller 12 to distribute ice or water at dispensers 22 and 24, respectively. It will be understood that the ice dispenser 22 and water dispenser 24 are optional features, and refrigerator 1 need not include an ice dispenser 22 or water dispenser 24. For example, ice maker 20 may be configured to supply ice to an internal storage tray (not shown) in a known manner.

Refrigerator 1 may also include a user interface 26. The user interface 26 may be disposed on an external surface of one of the doors 6 or 7, or an external surface of cabinet 2. The user interface 26 may also be disposed within freezer space 3 or refrigeration compartment 4, or other suitable location as required for a particular application. User interface 26 may include a display 28. Display 28 may comprise a screen such as an LCD or LCD screen, or display 28 may comprise one or more light sources that can be selectively illuminated to provide information to a user. User interface 26 may also include one or more user input features such as push buttons 30. Display 28 may also comprise a touch screen to provide for user input. Display 28 may comprise one or more illuminated icons and/or other symbols and/or wording to communicate specific information to a user. For example, display 28 may include a "purge water filter" message that can be selectively illuminated to prompt a user to purge a water filter 15 after installation of a new water filter 15. User interface 26 may further comprise an audio device that provides a noise signal to alert a user that action (e.g. purging of a new water filter 15) is required.

Figure 2:
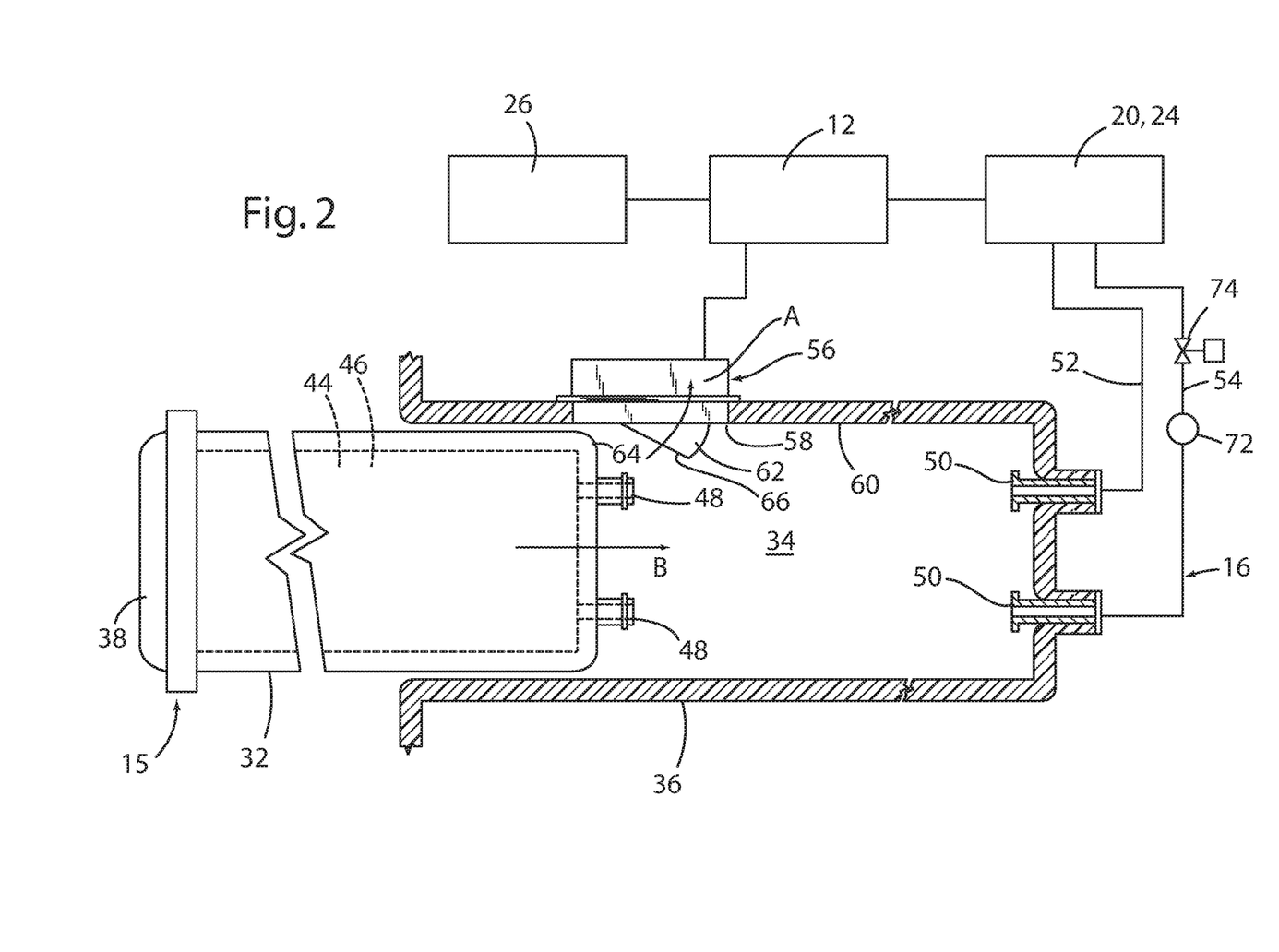
FIG. 2 is a partially fragmentary cross sectional view of a replaceable water filter and a filter housing that receives the water filter.

With further reference to FIG. 2, water filter 15 may comprise a cylindrical body 32 that is received in a cavity 34 formed by a filter housing 36. The water filter 15 may include a handle 38 that can be grasped by a user during installation and removal of water filter 15. In the example illustrated in FIG. 1, the water filter 15 and filter housing 36 are positioned along a lower portion 40 of front side 42 of refrigerator 1. However, it will be understood that water filter 15 may be positioned at other locations of refrigerator 1 according to the requirements of a particular application.

Referring again to FIG. 2, water filter 15 may include an internal cavity 44 with filter material 46 disposed in the cavity 44 in a known manner. Water filter 15 may also include fluid connectors 48 that detachably connect to fluid connectors 50 upon installation of water filter 15 in filter housing 36 to thereby filter water flowing through conduits 52 and 54 of water distribution system 16. The fluid connectors 48 and 50 may comprise known connectors, and the conduits 52 and 54 may be configured to supply water to an ice maker 20 and/or water dispenser 24 utilizing powered valve 74 and/or pump 72 in a known manner.

Refrigerator 1 includes a sensor such as a rocker switch 56 that generates a signal that can be utilized by a controller 12 to determine if a water filter 15 is disposed in the filter housing 36. Rocker switch 56 is mounted in an opening 58 in a sidewall 60 of filter housing 36, and a movable rocker member 62 protrudes into cavity 34 of filter housing 36, unless a water filter 15 is inserted into the cavity 34. The rocker member 62 is biased to an extended position as shown in FIG. 2. Upon insertion of a water filter 15, an outer surface 64 of water filter 15 contacts ramped surface 66 of rocker member 62 thereby moving the rocker member 62 inwardly in the direction of the arrow "A." It will be understood that other sensors or the like may be utilized instead of rocker switch 56 to enable controller 12 to determine if a water filter 15 is present in the filter housing 36. Other sensors may be used in place of rocker switch 56 to provide indication of presence, or lack thereof, of the filter.

In use, a user removes an old water filter 15 by grasping handle 38 and pulling the filter 15 in a direction opposite the arrow "B." A new water filter 15 is then installed by sliding the water filter 15 into the cavity 34 of filter housing 36 in the direction of the arrow "B" until the fluid connectors 48 of water filter 15 engage the fluid connectors 50 of water distribution system 16. As the water filter 15 is shifted into place in filter housing 36, rocker switch 56 is actuated. The controller 12 is configured to determine that the change of state of rocker switch 56 indicates that a new water filter 15 has been installed in the filter housing 36. As discussed in more detail below in connection with water filter 15A (FIGS. 5, 6), controller 12 may be configured such that a change of state of rocker switch 56 initiates communication between controller 12 and a memory unit or device 84.

Upon determining that a new water filter 15 has been installed, the controller 12 then causes the user interface 26 to prompt a user to purge the new water filter 15. For example, the user interface 26 may provide an illuminated message "purge water filter," and may also provide an audio signal such as a ringing sound or other suitable noise. When the water filter 15 is initially installed, the internal cavity 44 of water filter 15 may be filled with filter material 46 and air. Purging of the water filter 15 requires causing a predefined minimum amount of water to flow through the water filter 15 to purge the air from water filter 15. In general, the total amount of water flowing through water filter 15 can be determined if the flow rate and time are known (i.e. the total amount of water is the product of the flow rate and the time interval). Testing can be conducted to determine the flow rate of water through water filter 15 for a specific refrigerator configuration/design. Controller 12 may be configured to cause user interface 26 to continue signaling that the water filter 15 needs to be purged (e.g. by actuating button/lever 70 until a required amount of water has flowed through water filter 15.

Following installation of a new water filter 15, controller 12 may be configured to cause user interface 26 to provide a signal to a user indicating that the water filter needs to be purged until a predetermined amount of water has flowed through the new water filter 15. A user can actuate the pump 72 and/or valve 74 by pushing on pad or lever 70 to cause water to be dispensed from water dispenser 24. Alternatively, controller 12 may initiate a purge when a user resets or otherwise indicates that filter 15 has been replaced. Once the required amount of water for purging water filter 15 has flowed through the water distribution system 16 and filter 15, controller 12 no longer causes user interface 26 to signal that the water filter 15 needs to be purged. Alternately, user interface 26 may include a "purge water filter" input feature (e.g. a push button) that can be actuated by a user to purge a new water filter 15. Controller 12 may be configured to actuate pump 72 and/or valve 74 to cause water to flow through a new water filter 15 for a predetermined period of time such that a predefined amount of water flows through a new water filter 15.

Also, controller 12 may be configured to cause user interface 26 to continue signaling that a purge is required for a period of time following installation of a new water filter if a user does not purge water filter 15. For example, controller 12 may be configured to cause user interface to display a "purge water filter" message and generate an audio signal for a 14 day period of time following installation of a new water filter 15 to thereby prompt a user to purge the water filter 15. If a user does not purge water filter 15 during the 14 day period, controller 12 may be configured to stop displaying a "purge water filter" signal on user interface 26, or the controller 12 may be configured to cause user interface 26 to only display the "purge water filter" signal at periodic intervals without an audio signal after the 14 day period of time. It will be understood that 14 days is merely an example of a possible time period, and other lengths of time may also be utilized.

Also, user interface 26 may be configured to display instructions concerning how to purge water filter 15. For example, user interface 26 may provide an illuminated signal instructing a user to "push water pad to purge filter" until the required amount of water has passed through the new water filter 15. Additional information concerning purging of water filter 15 may also be displayed by user interface 26.

Also, user interface 26 may include a user input feature (e.g. button 30) that enables a user to signal controller 12 that a new water filter 15 has been installed. In this case, the refrigerator 1 does not necessarily include a sensor such as rocker switch 56 to indicate when a new water filter is installed. Controller 12 may be configured to initiate purging of filter 15 upon receiving a signal from a button 30, or controller 12 may be configured to provide a user with further instructions concerning the procedure for purging the new water filter 15. For example, user interface 26 may provide an illuminated signal "push water pad to purge filter" as discussed above.

Figure 3:
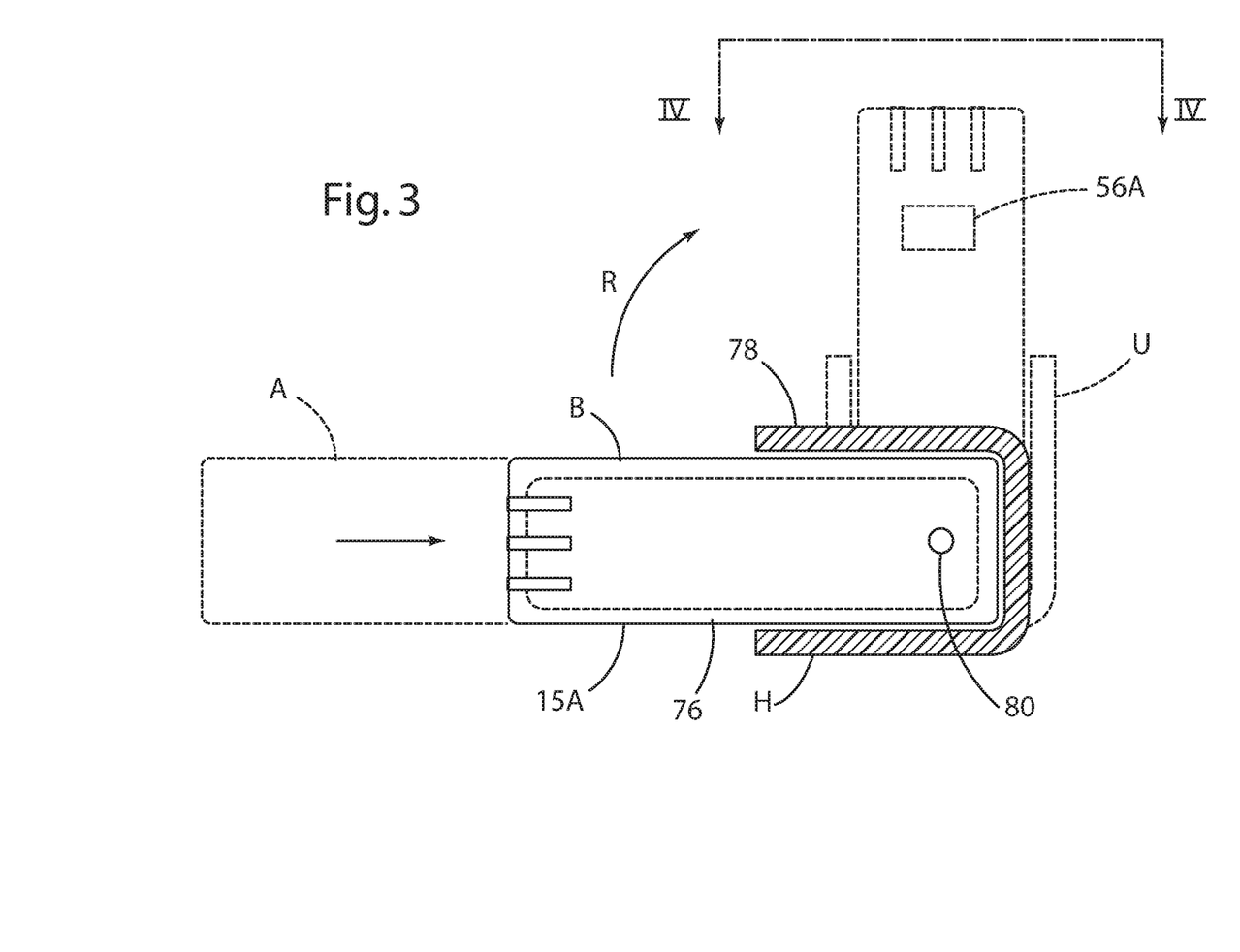
FIG. 3 is a partially schematic view of a replaceable water filter and a pivotable water filter housing according to another aspect of the present invention.
Figure 4:
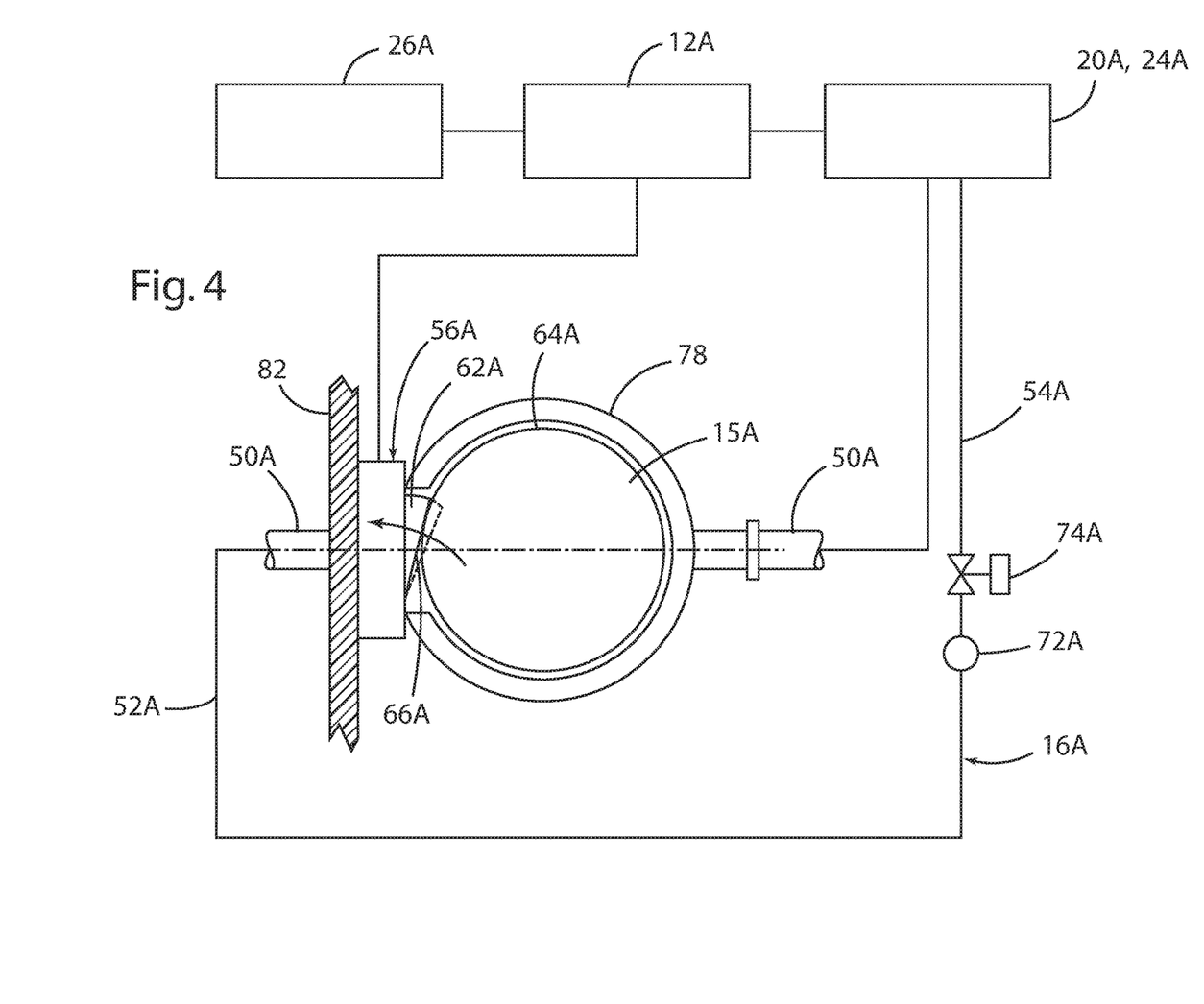
FIG. 4 is a view of the water filter and filter housing of FIG. 3 taken along the line IV-IV.

With further reference to FIGS. 3 and 4, a water filter 15A according to another aspect of the present invention includes a cylindrical body 76 that is received in a rotatable filter housing 78. Filter housing 78 is rotatably mounted to refrigerator structure 82 for rotation about an axis or bearing structure 80 from a horizontal position "H" (FIG. 3) to an upright position "U." During installation, water filter 15A is horizontally shifted from a first position "A" to an installed position "B." The water filter 15A and housing 78 are then rotated from the horizontal position "H" to the upright position U.

With reference to FIG. 4, upon insertion of water filter 15A in filter housing 78, the water filter 15A is fluidly connected to connectors 50A located at the bearing structure 80 to thereby fluidly connect the water filter 15A to fluid conduits 52A and 54A. The pivoting filter housing 78 and connectors 50A may be constructed according to known designs, such that details of these features are not described in detail herein.

Referring again to FIG. 4, a sensor such as a rocker switch 56A is configured to provide a signal to controller 12A when a new water filter 15A has been installed. Specifically, as a new water filter 15A is rotated from the horizontal position H to the upright position U (FIG. 3), outer surface 64A of water filter 15A contacts ramped surface 66A of rocker member 62A of rocker switch 56A to thereby actuate rocker switch 56A and generate a signal to the controller 12A. The change of state of rocker switch 56A is interpreted by controller 12A to mean that a new water filter 15A has been installed. Rocker switch 56A may be mounted to stationary refrigerator structure 82.

The fluid conduits 52A and 54A are fluidly connected to an ice maker 20A and/or a water dispenser 24A, and controller 12A controls the flow of water through the water circulation system 16A utilizing pump 72A and/or valve 74A in substantially the same manner as described in more detail above in connection with FIGS. 1 and 2. Controller 12A is operably connected to a user interface 26A, and user interface 26A may provide visual and/or audio information to a user in substantially the same manner as described in more detail above in connection with a user interface 26 (FIGS. 1 and 2) to thereby prompt a user to purge the water filter 15A. It will be understood that various other types of sensors may be utilized to detect the presence of a new water filter 15A, and the rocker switch 56A is therefore merely an example of a preferred embodiment.

Figure 5:
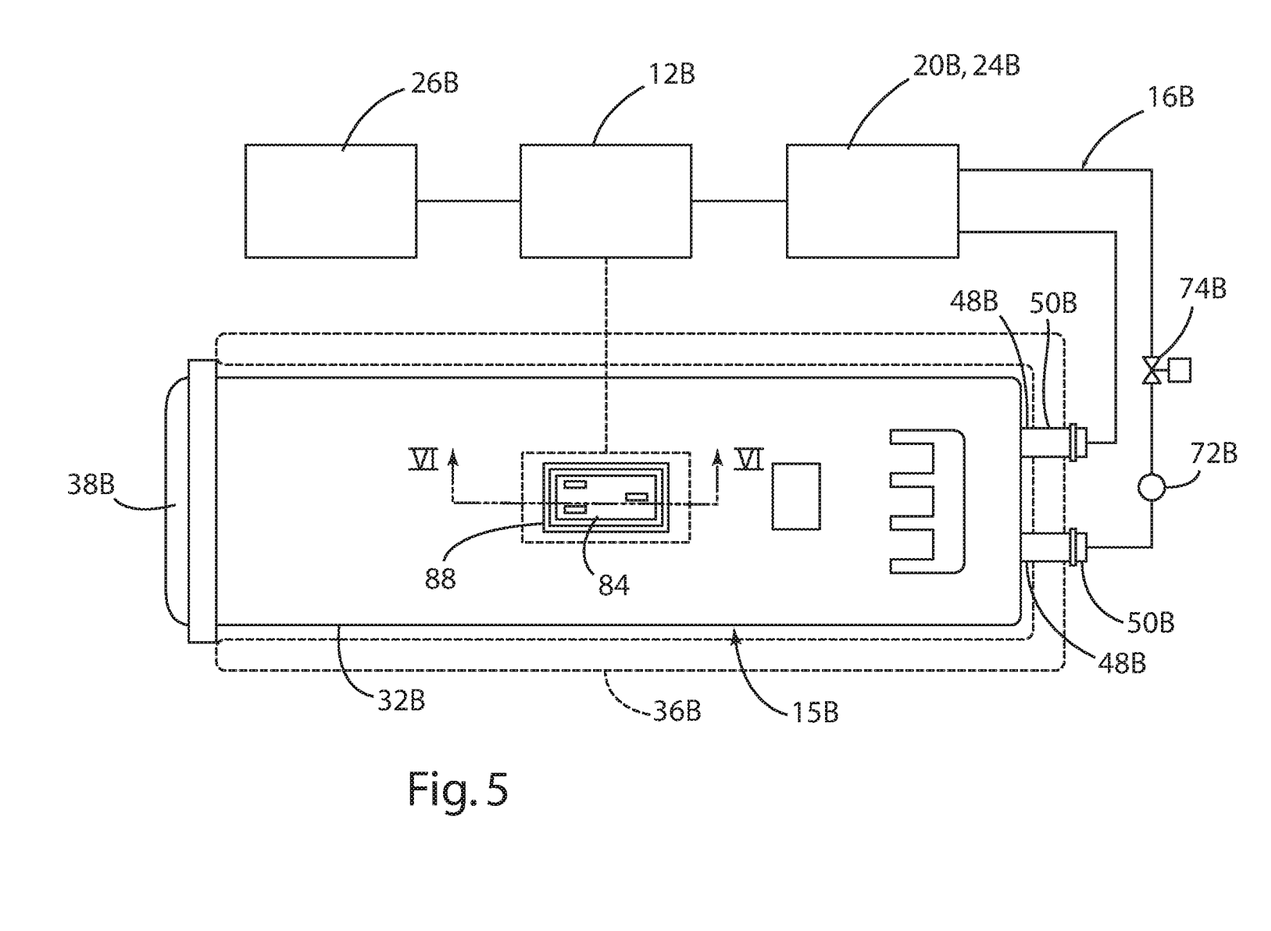
FIG. 5 is a partially schematic view of a refrigerator including a water filter having a memory unit according to another aspect of the present invention.
Figure 6:
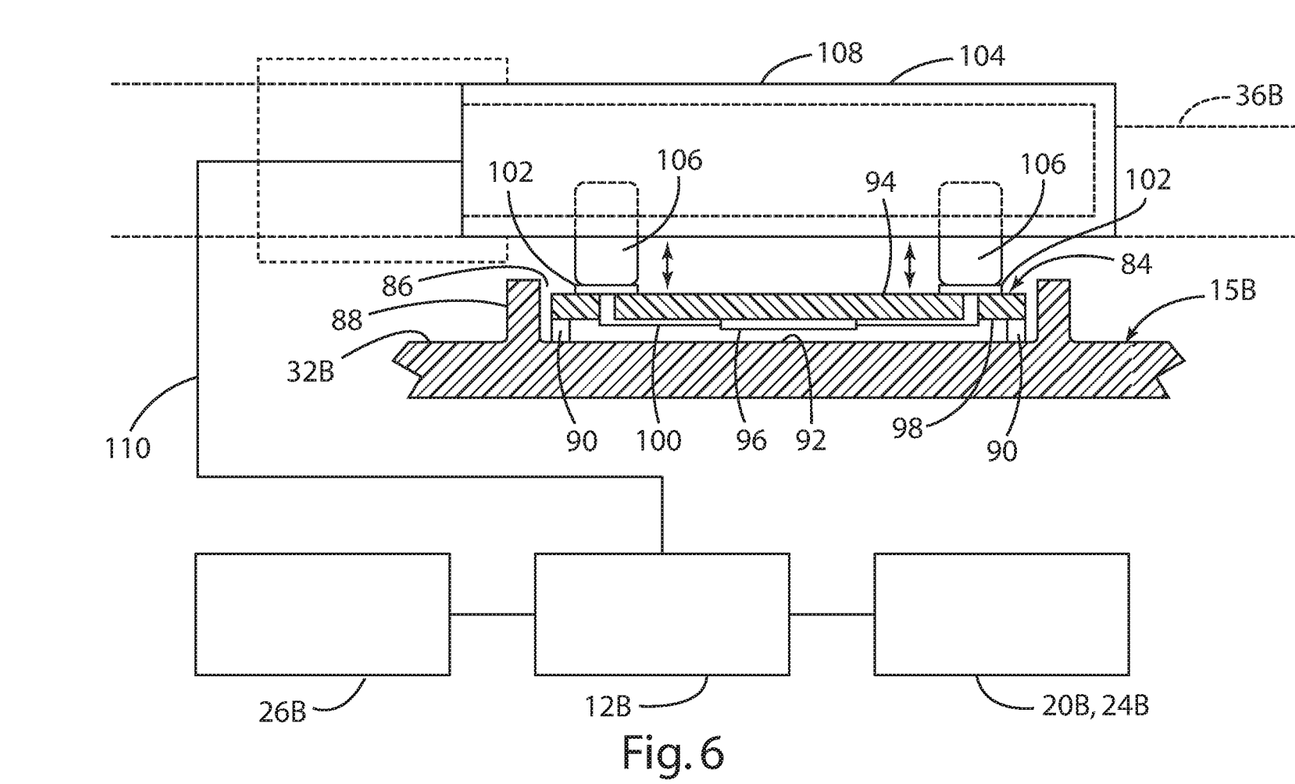
FIG. 6 is a cross sectional view of the water filter of FIG. 5 taken along the line VI-VI.

With further reference to FIGS. 5 and 6, a water filter 15B according to another aspect of the present invention includes a cylindrical body 32B that may be substantially similar to the cylindrical body 32 of water filter 15 of FIG. 2. Water filter 15B is received in a filter housing 36B, and includes connectors 48B that fluidly interconnect with connectors 50B to thereby provide for flow of water through water filtration system 16B to an ice maker 20B and/or water dispenser 24B. Flow of water though the water circulation system 16B may be controlled by a controller 12B that is operably connected to a pump 72B and/or a valve 74B.

Water filter 15B includes a memory device 84 that is mounted in a shallow recess or cavity 86 formed by upstanding sidewalls 88 of cylindrical body 32 of water filter 15B.

With reference to FIG. 6, filter body 32B of water filter 15B may include standoffs or spacers 90 that retain memory device 84 in a spaced apart location relative to outer surface 92 of filter body 32B within cavity 86. Memory device 84 may be secured in place utilizing adhesives or other suitable connecting arrangement. Memory device 84 may comprise a board 94 that is made of a substantially non-conductive material. An electronic integrated circuit memory unit or chip 96 may be disposed on lower surface 98 of board 94. Conductive material in the form of traces 100 electrically interconnects the memory chip 96 to electrical contacts 102. An electrical connector 104 includes a housing 108 that is secured to filter housing 36B. Electrical connector 104 also includes spring loaded contacts 106 that are biased into contact with contacts 102 of memory device 84 when water filter 15B is fully installed in filter housing 36B. An electrical line 110 operably interconnects the electrical connector 104 to controller 12B. Thus, when water filter 15B is fully installed in filter housing 36B, spring loaded contacts 106 are in electrical contact with contacts 102 of memory device 84, and controller 12B can therefore determine if a new water filter 15B has been installed. Furthermore, controller 12B can communicate with the memory unit 96 to retrieve and/or store information. Contacts 106 may also be disposed on surfaces 66 or 66A of rocker switches 56 and 56A, respectively.

Memory unit 96 may be configured to store information concerning the amount of water that must flow through a specific water filter 15B to provide for proper purging. Memory unit 96 may also store information concerning the allowable filter life (i.e. volume of water that may flow through filter 15B before filter 15B needs to be replaced). Memory unit 96 may also store information concerning the manufacturing date of the filter, filter installation date/time, and/or information concerning how long the water filter 15B has been installed in a particular refrigerator. Still further, memory unit 96 may be configured to store information concerning the amount of water that has flowed through a particular water filter 15B. For example, upon installation of water filter 15B, controller 12B may communicate with memory unit 96 to store information in memory unit 96 concerning the amount of water that has flowed through a particular water filter 15B.

Controller 12B may be configured to cause user interface 26B to display information concerning the need to purge a new water filter 15B when controller 12B determines that a new water filter 15B has been installed. The prompts and signals for purging water filter 15B may be substantially similar to the arrangements described in more detail above in connection with FIGS. 1 and 2.

In addition to the water filter purge prompts/alerts, controller 12B may also be configured to cause user interface 26B to display information concerning the filter life of a water filter 15B. For example, user interface 26B may display the percentage of usable life of water filter 15B that has been used and/or is remaining. This information could comprise a message, or it may comprise a graphical representation of the remaining water filter life. For example, if a water filter is configured to allow for one thousand gallons of water before requiring a replacement, user interface 26B could display a message such as "20% of filter life remaining" after 800 gallons of water have passed through a particular water filter 15B. This provides a user with information concerning the remaining life of a water filter 15B. User interface 26B may also be configured to provide various alerts to a user when a water filter 15B needs to be replaced. For example, user interface 26B could simply display a signal "replace water filter" once the allowable amount of water has passed through a water filter 15B. A "replace water filter" signal may also be displayed if a water filter has been installed for the maximum allowable period of time (e.g. two years). If the water filter 15B is not replaced despite the fact it has exceeded its allowable life, user interface 26B may provide additional prompts to alert a user that the water filter 15B needs to be replaced. For example, the user interface 26B could provide a flashing light and/or an audible signal concerning the past due water filter replacement.

It has been found that electrical contacts 102 and/or 106 tend to corrode quickly if controller 12B is in constant communication with memory chip 96. Thus, in a preferred embodiment, controller 12B is configured to communicate with memory chip 12B at specified time intervals. For example, controller 12B may communicate with memory chip 96 for a very brief interval, (e.g. several seconds or less) once every 24 hours, or only when refrigerator doors 6 and/or 7 are opened, or other usage cues based on user interaction with the refrigerator. Such usage cues may comprise actuation of ice and/or water dispensers 22 and 24, respectively.

It will be understood that the memory device 84 could comprise other devices. For example, memory device 84 could comprise an RFID tag, and the refrigerator may include an RFID reader that communicates with the RFID tag.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A method for installing a water filter within a refrigerator, the method comprising steps of:
installing said water filter within a water distribution system, wherein the water distribution system includes a controller;
engaging said water filter with the water distribution system, wherein said water filter is in communication with the controller;
activating a purge water filter mode of the water distribution system;
providing a purge water filter signal;
maintaining the purge water filter signal for at least one of (1) a predefined period of time and (2) until a predefined amount of water passes through said water filter, wherein the purge water filter signal is selectively displayed within a user interface of said refrigerator;
determining a water flow rate through said water filter when a powered valve of the water distribution system is open;
measuring a length of time the powered valve has been open after engagement of said water filter with the water distribution system;
calculating an amount of water that has flowed through said water filter utilizing the water flow rate and length of time the powered valve has been open; and
causing the user interface to generate the purge water filter signal indicating that said water filter need to be purged unless a predefined minimum amount of water has flowed through said water filter after engagement of said water filter with the water distribution system.

2. The method of claim 1, wherein the purge water filter mode is defined by the controller activating a pump to cause the predefined amount of water to flow through said water filter.

3. The method of claim 1, wherein the purge water filter mode is defined by the controller activating the purge water filter signal, wherein the purge water filter signal is adapted to provide an indicia to a user to initiate a flow of the predefined amount of water through said water filter.

4. The method of claim 1, wherein the purge water filter signal includes a selectively activated auditory signal generated by said refrigerator.

5. The method of claim 1, wherein activation of the purge water filter mode is automatically initiated when said water filter is placed in communication with the controller.

6. The method of claim 1, further comprising steps of:
providing a memory storage device within said water filter;
storing usage information relating to a volume of the predefined amount of water that has passed through said water filter;
accessing the usage information; and
causing the user interface to display information relating to the usage information.

* * * * *